(12) United States Patent
Chen et al.

(10) Patent No.: US 10,161,054 B2
(45) Date of Patent: Dec. 25, 2018

(54) PREFERABLY ORIENTED NANOTWINNED AU FILM, METHOD OF PREPARING THE SAME, AND BONDING STRUCTURE COMPRISING THE SAME

(71) Applicant: National Chiao Tung University, Hsinchu (TW)

(72) Inventors: Chih Chen, Hsinchu (TW); Wei-Lan Chiu, Kaohsiung (TW); Yi-Chia Chou, Chiayi (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 0 days.

(21) Appl. No.: 15/657,269

(22) Filed: Jul. 24, 2017

(65) Prior Publication Data

US 2017/0321339 A1 Nov. 9, 2017

Related U.S. Application Data

(62) Division of application No. 14/641,614, filed on Mar. 9, 2015, now Pat. No. 9,758,886.

(30) Foreign Application Priority Data

Aug. 14, 2014 (TW) .............................. 103127879 A

(51) Int. Cl.
*C25D 3/48* (2006.01)
*B32B 15/01* (2006.01)
(Continued)

(52) U.S. Cl.
CPC ................ *C25D 3/48* (2013.01); *B32B 15/01* (2013.01); *B32B 15/018* (2013.01); *C22C 5/02* (2013.01); *C25D 5/50* (2013.01); *C25D 21/10* (2013.01)

(58) Field of Classification Search
None
See application file for complete search history.

(56) References Cited

U.S. PATENT DOCUMENTS

| 4,401,719 A | 8/1983 | Kobayashi et al. |
| 2003/0001159 A1 | 1/2003 | Ohtani et al. |

(Continued)

FOREIGN PATENT DOCUMENTS

| CN | 103985667 A | 8/2014 |
| JP | H10251835 A | 9/1998 |

OTHER PUBLICATIONS

Hirai, K., et al., "Growth of Gold Plating Film on Various Nickel Substrates", Journal of the Surface Finishing School of Japan, vol. 43, 1992, Issue 9, pp. 868-872. (Year: 1992).*

(Continued)

*Primary Examiner* — Stefanie S Wittenberg
(74) *Attorney, Agent, or Firm* — Bacon & Thomas, PLLC

(57) ABSTRACT

The present invention is related to a preferably oriented nanotwinned Au film, a method of preparing the same, and a bonding structure comprising the same. The nanotwinned Au film has a thickness direction. The nanotwinned Au film is stacked along a [220] crystallographic axis orientation in the thickness direction. At least 50% by volume of the nanotwinned Au film is composed of a plurality of nanotwinned Au grains which are adjacent to each other, arranged in a direction perpendicular to the thickness direction, and stacked along a [111] crystallographic axis orientation.

8 Claims, 11 Drawing Sheets

(51) Int. Cl.
*C25D 5/50* (2006.01)
*C25D 21/10* (2006.01)
*C22C 5/02* (2006.01)

(56) References Cited

U.S. PATENT DOCUMENTS

2010/0291385 A1* 11/2010 Greer ................ B81C 1/00031
428/398
2012/0135260 A1* 5/2012 Jang ................ C25D 5/022
546/546
2016/0046099 A1 2/2016 Chen et al.

OTHER PUBLICATIONS

Yoshizawa, I., et al., "Effects of Plating Conditions on Crystal Grains of Gold Deposits Obtained from Citrate Bath", Journal of the Metal Finishing Society of Japan, vol. 21, 1970, Issue 8, pp. 416-420. (Year: 1970).*

* cited by examiner

PREFERABLY ORIENTED NANOTWINNED AU FILM, METHOD OF PREPARING THE SAME, AND BONDING STRUCTURE COMPRISING THE SAME

CROSS REFERENCE TO RELATED APPLICATION

This application claims the benefits of the Taiwan Patent Application Serial Number 103127879, filed on Aug. 14, 2014, the subject matter of which is incorporated herein by reference.

BACKGROUND OF THE INVENTION

1. Field of the Invention

The present invention relates to a preferably oriented nanotwinned Au film and a method of preparing the same, and especially to a nanotwinned Au film composed of a plurality of nanotwinned Au grains stacked along a [220] crystallographic axis orientation in a thickness direction and a method of preparing the same.

2. Description of Related Art

The hardness and mechanical property of a metal material could be adjusted by the grain size of the metal. For example, some metal films with nano-grains or nanotwinned structures have higher hardness. In general, gold has a low hardness. When gold is used as an accessory, it could be easily deformed due to collision or extrusion. Thus, not only the aesthetic level of the gold accessory is reduced, but also the value of the gold accessory processing is decreased as well. Gold is also commonly used in jewelry-inlaying. However, since gold has low hardness; hence, the inlaid jewelry could easily fall off from gold. Accordingly, nanocrystalline Au grains or nanotwinned Au structures could be formed to increase the hardness of gold. Consequently, the surface hardness of the gold accessory or jewelry-inlaid gold could be improved to ensure wear resistance and to prevent the inlaid jewelry from falling off from gold. In addition, nanotwinned metals with nano-crystallinity could also be applied as the metal materials such as a through silicon via (TSV), an interconnection, a pin through hole, a metal wire (e.g., a copper interconnect), a circuit of a substrate. This could ensure the reliability of the electrical contacts and prolong the usage lifetime.

Gold also has a high conductivity nature. It is; thus, also a highly suitable metal for electrical connection in package structure. However, the Au grains in conventional electrical contacts made of gold materials lack specific crystallographic orientation. Since the Au grains at the surface of the electrical contacts are in random orientations; hence, the bonding process needs to be performed at a higher temperature or higher pressure. The excessively high temperature or high pressure could easily damage the elements of electronic products, such as a semiconductor chip. If the temperature of the gold bonding process is decreased, then, a higher pressure is required. In this way, the gold bonding process would be too complicated and necessitate expensive equipment. The overly high pressure could also affect the electronic product yield as well.

Conventional methods for preparing a nanotwinned Au film include the followings: (1) The nanowire plating method for preparing an Au nanowire with nanotwinneds; this method; however, cannot prepare a nanotwinned Au film. It is also not widely used due to its long processing time; (2) The annealing method for preparing a nanotwinned Au film; this method; however, cannot successfully prepare an Au film with high density of nanotwinneds and regular arrangement; (3) the alloy method followed by the annealing process for preparing a nanotwinned Au structure; this method; however, needs the use of alloy, which reduces not only the purity of the prepared gold but also the value thereof when used in gold ornaments; and (4) the copper doping method for increasing the hardness of gold; this method; however, forms a karat gold with decreased luster and purity than a pure gold, which results in its lower value than a pure gold.

Therefore, there is an urgent need to develop a novel Au film and a method for preparing the same, where the Au film could have a nanotwinned structure and a preferred orientation. Such novel Au film could then be used in the accessory industry to increase the hardness of gold accessory and improve the reliability of its associated processing. In addition, such novel Au film could also be used in the electronics industry. The property of the nanotwinned structure and a preferred orientation could avoid the conventional high-temperature and high-pressure process used for the preparation of electrical contacts. Thereby, the product yield of electronic products could be increased with reduced costs. Compact electronic products with high performance could also be prepared.

SUMMARY OF THE INVENTION

The present invention provides a preferably oriented nanotwinned Au film and a method for preparing the same. The nanotwinned Au film comprises a plurality of nanotwinned Au grains, which causes the nanotwinned Au film to have good hardness and mechanical property. The nanotwinned Au film could be used in the gold accessory industry and the jewelry industry. The nanotwinned Au film comprising a plurality of nanotwinned Au grains could be formed on the surface of a gold ornament to increase its hardness without affecting its appearance.

The preferably oriented nanotwinned Au film of the present invention with its excellent mechanical property and electromigration resistance ability could also be used in the electronics industry. Specifically for the electrical contacts in a variety of electronic products, the present invention provides a bonding structure having a preferably oriented nanotwinned Au film and a method for preparing the same. By controlling the plating condition for nanotwinned Au film formation, a preferably oriented [220] crystallographic plane is formed on the surface of the nanotwinned Au film. The Au atoms are stacked along the direction of the [220] crystallographic plane. Accordingly, the nanotwinned Au film having the [220] crystallographic plane may achieve good bonding at low temperature and low pressure.

The preferably oriented nanotwinned Au film of the present invention has a thickness direction. The nanotwinned Au film is stacked along a [220] crystallographic axis orientation in the thickness direction. At least 50% by volume of the nanotwinned Au film is composed of a plurality of nanotwinned Au grains. These nanotwinned Au grains are adjacent to each other, arranged in a direction perpendicular to the thickness direction, and stacked along a [111] crystallographic axis orientation.

The preferably oriented nanotwinned Au film of the present invention may have a thickness of 0.05-1000 μm, with a preferred thickness of 1-10 μm. The nanotwinned Au grains may have a long axis of 0.05-100 μm in length, with a preferred length of 0.05-10 μm, and a short axis of 1-200 nm in length, with a preferred length of 20-100 nm.

In the preferably oriented nanotwinned Au film of the present invention, at least 50% of the area of any cross-section perpendicular to the thickness direction of the nanotwinned Au film is a [220] crystallographic plane.

Another object of the present invention is to provide a method for preparing a preferably oriented nanotwinned Au film, which comprises: (A) a plating apparatus comprising an anode, a cathode, a direct current supply, and a plating solution comprising a gold ion, a chloride ion, and an acid, wherein the direct current supply is electrically connected to the anode and the cathode that are immersed in the plating solution; and (B) a direct current supply to provide a direct current for plating, a preferably oriented nanotwinned Au film forms on the surface of the cathode, the preferably oriented nanotwinned Au film has a thickness direction, the preferably oriented nanotwinned Au film is stacked along a [220] crystallographic axis orientation in the thickness direction, at least 50% (preferably 70%) by volume of the nanotwinned Au film is composed of a plurality of nanotwinned Au grains, these nanotwinned Au grains are adjacent to each other, arranged in a direction perpendicular to the thickness direction, and stacked along a [111] crystallographic axis orientation.

According to step (B) of the method for preparing a preferably oriented nanotwinned Au film of the present invention, the cathode or the plating solution could be rotated at a rotational speed of 300-1500 rpm and preferably 400-1200 rpm during plating in order to improve the direction and speed of the growth of nanotwinned grains.

According to step (B) of the method for preparing a preferably oriented nanotwinned Au film of the present invention, the direct current supply provides a direct current with a current density of 1-100 mA/cm$^2$ and preferably 1-10 mA/cm$^2$.

According to the method for preparing a preferably oriented nanotwinned Au film of the present invention, the plating solution may further comprise at least one from the group consisting of a surfactant, a lattice modification agent, and mixtures thereof. The plating solution also comprises an acid that may be organic or inorganic to increase the electrolyte concentration and the plating speed. The acid may be at least one from the group consisting of hydrochloric acid (HCl), nitric acid (HNO$_3$), and sulfuric acid (H$_2$SO$_4$), and preferably hydrochloric acid (HCl) and nitric acid (HNO$_3$). The plating solution may also have a gold ion concentration of 5-15 g/L, and preferably 8-12 g/L. The gold ion of the plating solution is obtained by dissociation of a gold-containing salt. Such salt may be at least one from the group consisting of a gold sulfate and a gold sulfite, and preferably a gold sulfite. The plating solution also comprises chloride ions, which mainly function to fine-tune the direction of nanotwinned grain growth to result in a nanotwinned metal with a preferred crystal orientation. The chloride ion of the plating solution may be obtained by dissociation of chloride containing compounds. Such compounds may be at least one from the group consisting of hydrochloric acid (HCl), perchloric acid (HClO$_4$), chloric acid (HClO$_3$), chlorous acid (HClO$_2$), and hypochlorous acid (HOCl), and preferably hydrochloric acid (HCl) and chloric acid (HClO$_3$).

According to the method for preparing a preferably oriented nanotwinned Au film of the present invention, the thickness of the electrodeposited nanotwinned Au film can be adjusted by the length of the plating time. The preferably oriented nanotwinned Au film of the present invention may have a thickness of 0.05-1000 μm, and preferably 1-10 μm. The nanotwinned Au grains of the preferably oriented nanotwinned Au film may have a thickness of 0.05-1000 μm, and preferably 1-100 μm. These nanotwinned Au grains may have a diameter of 0.05-1000 μm, and preferably 1-100 μm.

As shown in the focused ion beam (FIB) cross-sectional view of FIG. 2A and the perspective view of FIG. 2B, the preferably oriented nanotwinned Au film 20 of the present invention comprises a large number of nanotwinned Au grains 21. Referring to the enlarged views shown in FIG. 3, the plurality of the nanotwinned Au grains 31 (e.g., the nanotwinned Au structure composed of a pair of adjacent black line and white line) are adjacent to each other. These nanotwinned Au grains 31 stack sequentially along the [111] crystallographic plane in the direction 32 and stacked along the [220] crystallographic plane in the direction 33, to form the nanotwinned Au film.

Based on the nanotwinned Au film described above, another object of the present invention is to provide a bonding structure having a preferably oriented nanotwinned Au film. This bonding structure comprises: a first substrate having a first Au film; and a second substrate having a second Au film; wherein at least one of the first Au film and the second Au film is the preferably oriented nanotwinned Au film described above; the first Au film and the second Au film are connected to each other and have a bonding interface.

In the bonding structure of the present invention, the thicknesses of the first Au film and the second Au film may be controlled by the electrical connecting structures of the first substrate and the second substrate. Their thicknesses may also be controlled by the regulation of the growth parameters. Each of their thicknesses may be 0.05-1000 μm, and preferably 1-500 μm.

In the bonding structure of the present invention, each of the first substrate and the second substrate may be selected from the group consisting of a semiconductor chip, a circuit board, a conductive substrate, and a variety of electronic components.

The bonding structure having the preferably oriented nanotwinned Au film of the present invention could be used to electrically connect the first substrate and the second substrate. Its preparation method may comprise: (A) providing a first substrate and a second substrate; (B) forming a first Au film on the first substrate with a first Au film surface exposed as well as forming a second Au film on the second substrate with a second Au film surface exposed, wherein at least one of the first Au film and the second Au film is the preferably oriented nanotwinned Au film of the present invention; (C) performing a bonding process where the first Au film surface and the second Au film surface are first in contact with each other and then a pressing force of 1 MPa or less is applied to cause the first Au film and the second Au film to bond to each other and form a gold bonding interface.

According to step (A) of the method for preparing the bonding structure of the present invention, each of the first substrate and the second substrate may be selected from the group consisting of a semiconductor chip, a circuit board, a conductive substrate, and a variety of electronic components.

According to step (B) of the method for preparing the bonding structure of the present invention, when the first Au film is the preferably oriented nanotwinned Au film of the present invention, the surface of the first Au film has 50 to 100% by area being a [220] crystallographic plane. The surface of the second nanotwinned Au film has 0 to 100% by area being a [111] crystallographic plane. The second nanotwinned Au film may be the preferably oriented nanotwinned Au film of the present invention or any other Au films formed by conventional methods. For example, the second nanotwinned Au film may be prepared by electron beam gun evaporation, DC plating, physical vapor deposition, or chemical vapor deposition. However, it is preferred that the second nanotwinned Au film is formed by using the method for preparing the nanotwinned Au film of the present invention. The parameters for the formation of the first Au film and the second Au film are regulated to obtain the first Au film and the second Au film to each have a thickness of 0.05-1000 μm, and preferably 0.05-500 μm. The parameters for the formation of the first Au film and the second Au film are regulated to provide a preferably oriented [220] crystallographic plane on the surface of the first Au film or the second Au film. The first Au film surface could have 50 to 100% by area, preferably 75 to 100% by area, and more preferably 85 to 100% by area being the crystallographic plane. It is not limited for the second Au film surface where the second Au film surface could have 0-100% by area, preferably 50 to 100%, and more preferably 75 to 100% by area being the [220] crystallographic plane.

According to step (C) of the method for preparing the bonding structure of the present invention, the pressing force could be applied from the first substrate to the second substrate for lamination, or vice versa. Alternatively, the first substrate and the second substrate could also be pressed against each other for lamination. The pressing force may be 0.01 to 1000 MPa, and preferably 0.1 to 10 MPa. In addition, the bonding process may be performed at a vacuum of $10^{-4}$ to 1 torr, and preferably $10^{-4}$ to $10^{-2}$ torr. Furthermore, the bonding process may be performed at a temperature between 20 to 300° C. When the ambient temperature during the bonding process is relatively low, the time required for bonding is relatively long. For example, when the bonding temperature is 150° C., the bonding time would be more than one hour. However, when the ambient temperature during the bonding process is relatively high, the time required for bonding is relatively short. For example, when the bonding temperature is 200° C., the required bonding time would be merely 15 minutes. In general, the bonding process does not have any particular requirements, as long as the two substrates could be bonded via the nanotwinned Au film.

As mentioned previously, for the bonding structure having the preferably oriented nanotwinned Au film and its preparation method, each of the first substrate and the second substrate may either be a semiconductor chip, a package substrate, or a circuit board, and preferably a semiconductor chip. Accordingly, the technique of the present invention could also be applied to a variety of packaging techniques derived from the IBM C4 technology. For example, the technique of the present invention could be applied in flip-chip packaging, ball grid array (BGA) substrate, wafer level chip scale packaging (WLCSP), and particularly in components with high frequency and high power. The technique of the present invention could also be applied to the three-dimensional package structure that requires higher mechanical property and product reliability. For example, when the first substrate and the second substrate are semiconductor chips, they could be formed into the so-called three-dimensional integrated circuit (3D-IC) after bonding. This three-dimensional integrated circuit could be used as the first substrate while the package substrate is used as the second substrate for bonding. However, the present invention is not limited thereto.

DETAILED DESCRIPTION OF THE PREFERRED EMBODIMENT

Hereafter, examples will be provided to illustrate the embodiments of the present invention. Other advantages and effects of the invention will become more apparent from the disclosure of the present invention. Other various aspects also may be practiced or applied in the invention, and various modifications and variations can be made without departing from the spirit of the invention based on various concepts and applications.

PREPARATION EXAMPLE 1

Preparation of a [220] Preferably Oriented Nanotwinned Au Film

Figure 1:
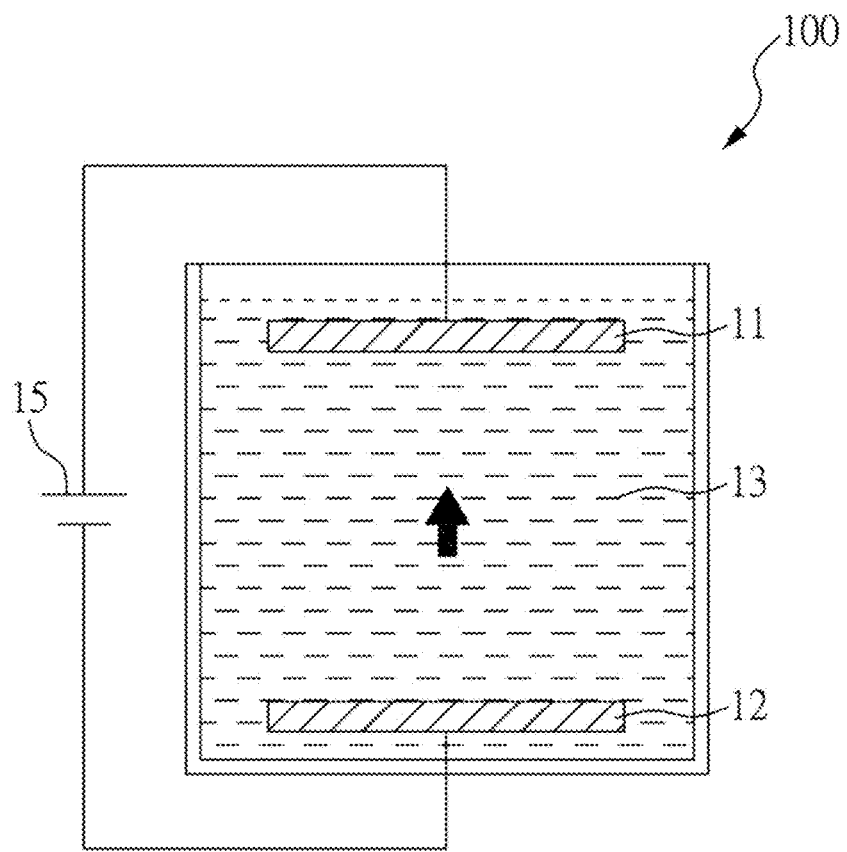
FIG. 1 is a schematic diagram showing the layout of the plating apparatus in Preparation Example 1 of the present invention.

FIG. 1 is a schematic diagram showing the layout of a plating apparatus 100. The plating apparatus 100 included an anode 11 and a cathode 12 immersed in a plating solution 13 and connected to a direct current supply source 15 (KEITHLEY2400). Here, the material of the anode 11 was a platinum substrate or grid while the material of the cathode 12 was a substrate with its surface coated with gold. However, a glass substrate, a quartz substrate, a metal substrate, a plastic substrate, or a printed circuit board with surfaces coated with a metal layer and a seed layer may also be used. The plating solution 13 comprised gold ions (10 g/L)

(prepared from gold sulfite), hydrogen chloride (150 mL/L), nitrate (150 mL/L), and double distilled water (700 mL/L).

Figure 2A:
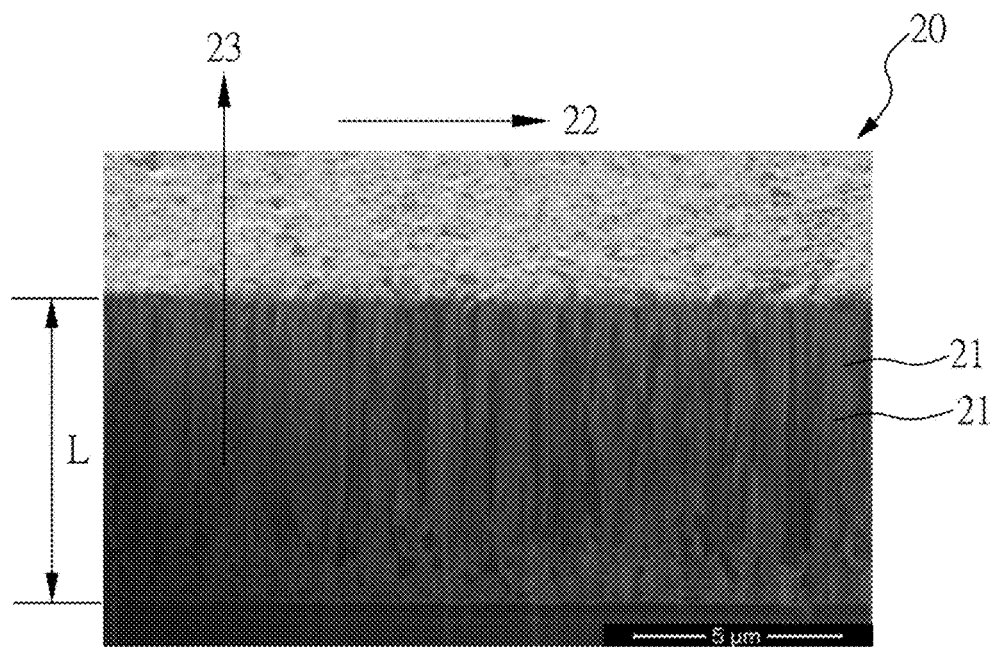
FIG. 2A is a cross-sectional view of the [220] preferably oriented nanotwinned Au film in Preparation Example 1 of the present invention produced by focused ion beam.
Figure 2B:
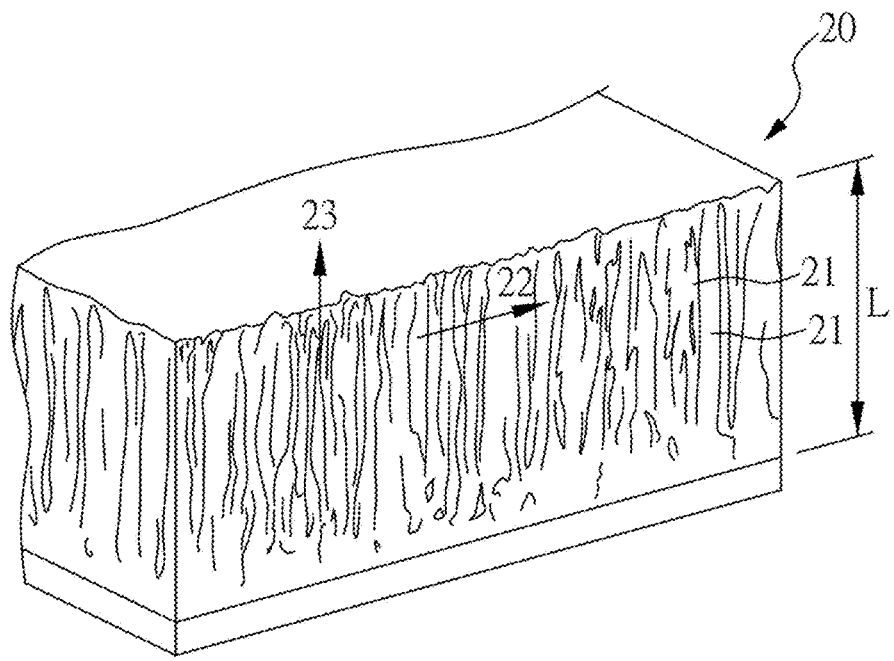
FIG. 2B is a perspective three-dimensional view of the [220] preferably oriented nanotwinned Au film in Preparation Example 1 of the present invention.
Figure 3A:
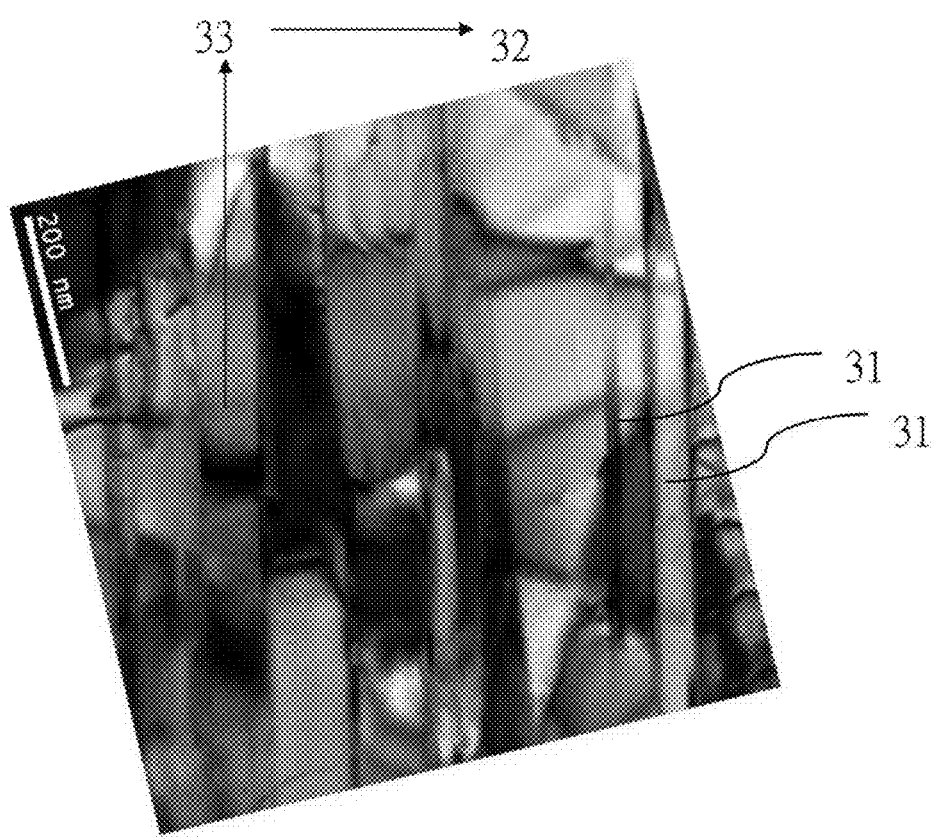
FIG. 3A is an enlarged view for the cross-sectional view of the [220] preferably oriented nanotwinned Au film in Preparation Example 1 of the present invention produced by focused ion beam.
Figure 3B:
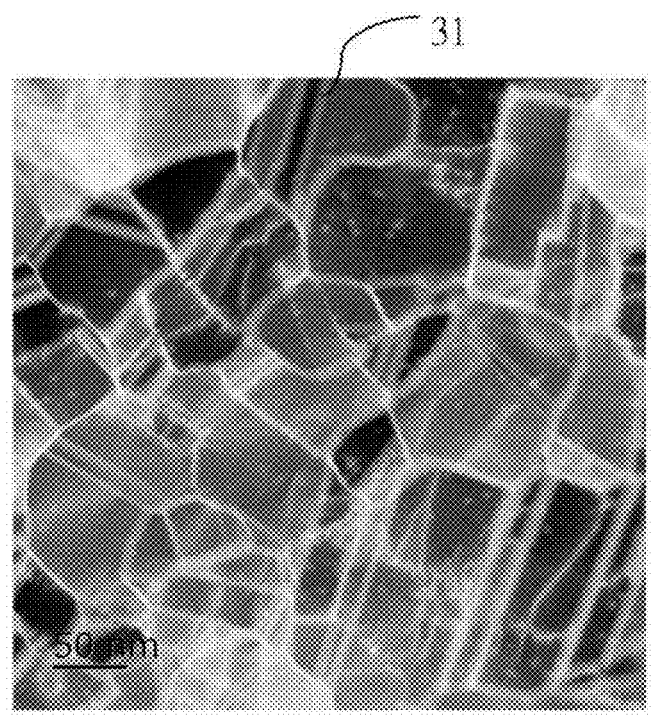
FIG. 3B is a top view of FIG. 3A.

Next, a DC current with a current density of 0.005 A/cm$^2$ was applied. A magnet stirrer (not shown) was added therein to agitate the plating solution 13 at a rotational speed of 600 rpm. A nanotwinned Au film was formed from the cathode 12 toward the direction indicated by the arrow. FIG. 2A is a focused ion beam cross-sectional view of the preferably oriented nanotwinned Au film in this Preparation Example. FIG. 2B is a perspective three-dimensional view of the preferably oriented nanotwinned Au film in this Preparation Example. As shown in FIGS. 2A and 2B, the preferably oriented nanotwinned Au film 20 of the present invention comprised a large number of nanotwinned Au grains 21. Referring to FIG. 3A, which is an enlarged view of FIG. 2A, the plurality of the nanotwinned Au grains 31 (e.g., the nanotwinned Au structure composed of a pair of adjacent black line and white line) were adjacent to each other. These nanotwinned Au grains 31 stacked sequentially along the [111] crystallographic plane in the direction 32. Referring to FIG. 3B, which is a top view of FIG. 3A, many nanotwinned Au grains 31 were present in the Au grains. Referring to FIG. 2B, the nanotwinned Au film had a thickness of 7.5 μm, and referring to FIG. 3B, the nanotwinned Au film had a short axis with 80 nm in length.

Figure 4:
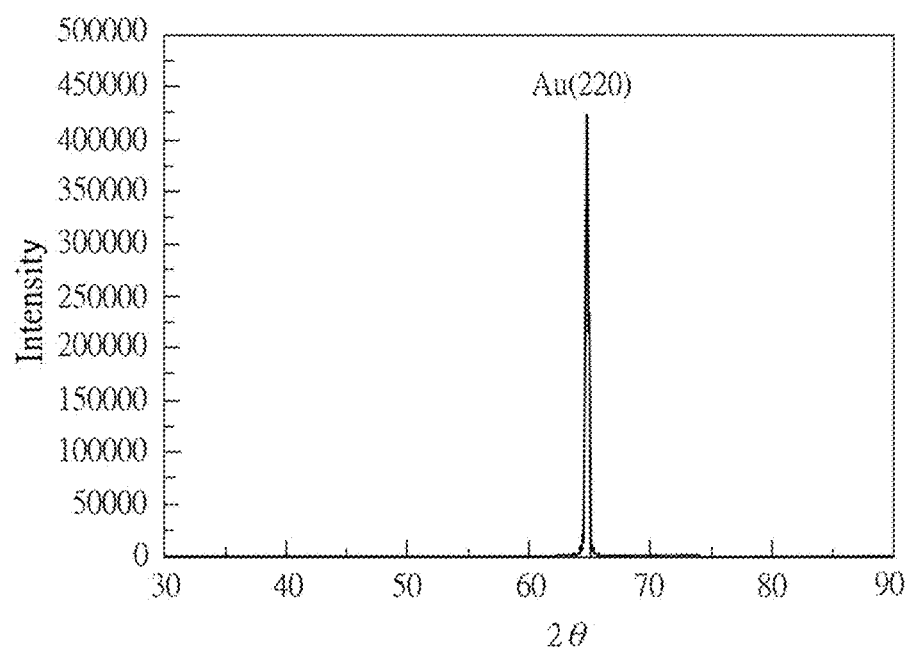
FIG. 4 shows the result for the x-ray diffraction analysis of the [220] preferably oriented nanotwinned Au film in Preparation Example 1 of the present invention.

FIG. 4 shows the result for the x-ray diffraction analysis of the [220] preferably oriented nanotwinned Au film in this Preparation Example. It can be seen from FIG. 4 that most of the Au grains had a [220] crystallographic axis in a preferred orientation (indicated by the "Au (220)" label in FIG. 3A).

Figure 5:
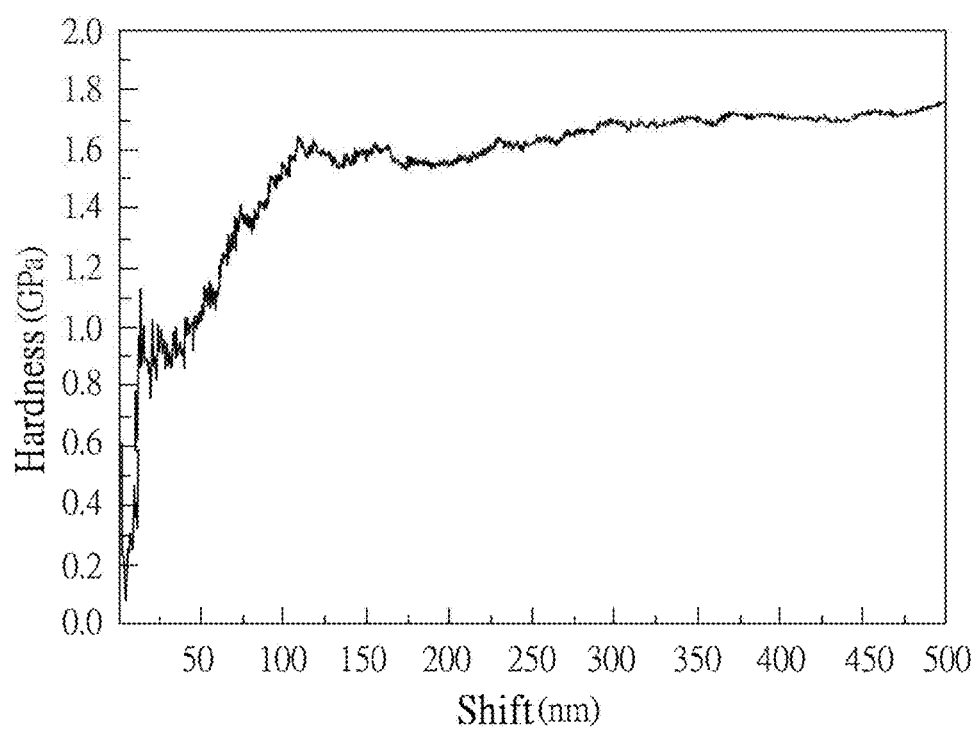
FIG. 5 shows the result for the hardness test of the [220] preferably oriented nanotwinned Au film in Preparation Example 1 of the present invention.

FIG. 5 shows the result for the hardness test of the [220] preferably oriented nanotwinned Au film in this Preparation Example. The nano-indentation test had a response rate of 0.05 (1/s) and an indentation depth of 500 nm. It can be seen from FIG. 5 that when the Au film had the nanotwinned Au structure, its hardness can be increased to 1.73 GPa, which is 1.4 times as hard as the common plated Au.

PREPARATION EXAMPLE 2

Preparation of a [111] Preferably Oriented Au Film

In this Preparation Example, a [111] preferably oriented Au film was prepared by plating. First, the same plating apparatus and the same plating solution in Preparation Example 1 were used as shown in FIG. 1. Next, at room temperature, a pulse current with a current density of 0.02 A/cm$^2$ and a T$_{on}$(sec)/T$_{off}$(sec) of 0.1 s/1.0 s was applied. A magnetic stirrer (not shown) was added therein to agitate the plating solution 13 at a rotational speed of 600 rpm. A preferably [111] oriented Au film was formed from the cathode 12 toward the direction indicated by the arrow.

Figure 6:
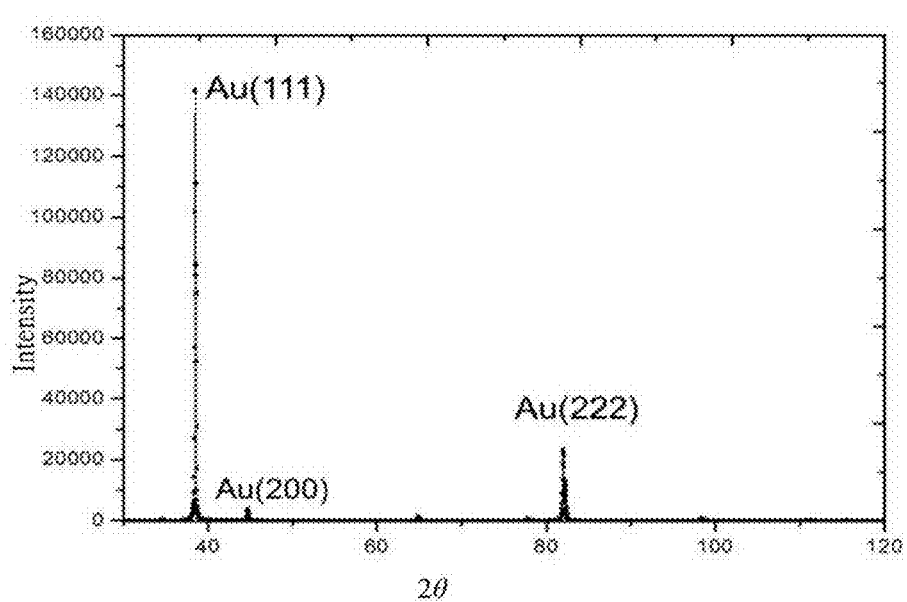
FIG. 6 shows the result for the x-ray diffraction analysis of the [111] preferably oriented nanotwinned Au film in Preparation Example 2 of the present invention.

FIG. 6 shows the result for the x-ray diffraction analysis of the [111] preferably oriented nanotwinned Au film in this Preparation Example. It can be seen from FIG. 6 that most of the Au grains had a [111] crystallographic axis in a preferred orientation (indicated by the "Au (111)" label in FIG. 6).

PREPARATION EXAMPLE 3

Preparation of an Irregularly Orientated Au Film

In this Preparation Example, an irregularly oriented Au film was prepared by plating. First, the same plating apparatus and the same plating solution in Preparation Example 1 were used as shown in FIG. 1. Next, the plating solution was heated to 60° C. and a pulse current with a current density of 0.02 A/cm$^2$ and a T$_{on}$(sec)/T$_{off}$(sec) of 0.1 s/1.0 s was applied. A magnetic stirrer (not shown) was added therein to agitate the plating solution 13 at a rotational speed of 600 rpm. An irregularly oriented Au film was formed from the cathode 12 toward the direction indicated by the arrow.

Figure 7:
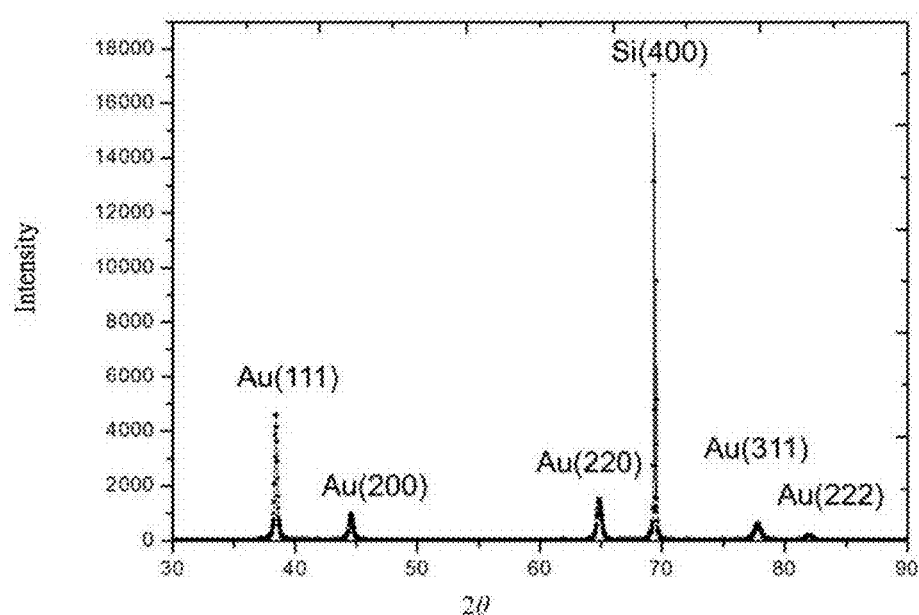
FIG. 7 shows the result for the x-ray diffraction analysis of the irregularly oriented Au film in Preparation Example 3 of the present invention.

FIG. 7 shows the result for the x-ray diffraction analysis of the irregularly oriented Au film in this Preparation Example. It can be seen from FIG. 7 that the grain arrangement of this Au film surface included a variety of orientations (indicated by the "Au (111)", "Au (200)", "Au (220)", "Au (400)", "Au (311)" and "Au (222)" labels in FIG. 7).

EXAMPLE 1

Figure 8:
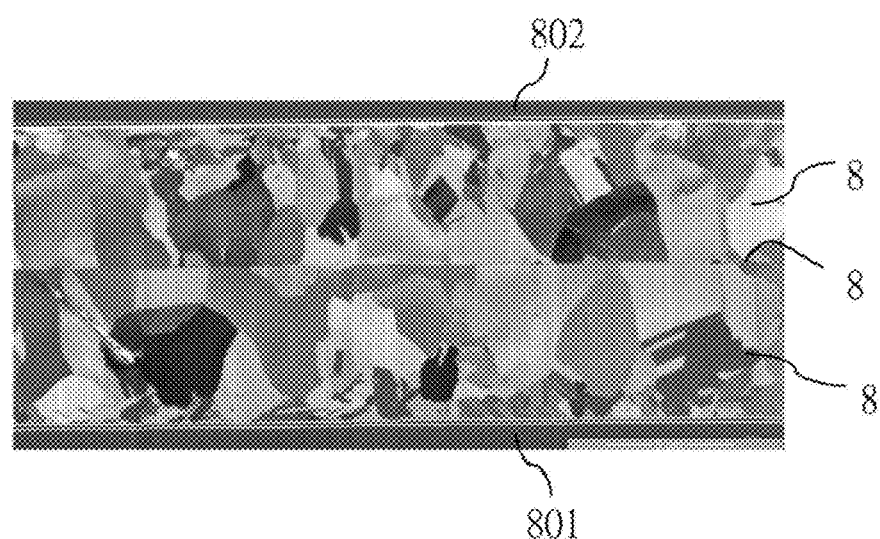
FIG. 8 is an optical microscope image of the Au film bonding structure in Example 1 of the present invention.

First, a first substrate and a second substrate were provided. The method described in Preparation Example 1 was used to form a first Au film and a second Au film on the first substrate and on the second substrate, respectively. Each of the first Au film and the second Au film was a [220] preferably oriented nanotwinned Au film. The first Au film and the second Au film had a thickness of about 7 μm each. Next, the first substrate and the second substrate were placed on the clamps to allow the first Au film and the second Au film to face toward each other. Then, the first substrate and the second substrate were placed in a vacuum furnace at a low vacuum of 10$^{-3}$ torr. The furnace was heated to 200° C. and maintained for 1 hour and a pressing force of 0.78 MPa was applied. By using the above steps, a bonding structure having a preferably oriented nanotwinned Au film was obtained. FIG. 8 is an optical microscope image of the Au film bonding structure in this example. This Au film bonding structure comprised: a first substrate 801 having a first Au film 83 and a second substrate 802 having a second Au film 86; wherein the first Au film 83 and the second Au film 86 were connected to each other with a gold bonding interface 87. No large void was observed in the gold bonding interface 87, which indicated a good bonding quality.

EXAMPLE 2

Figure 9:
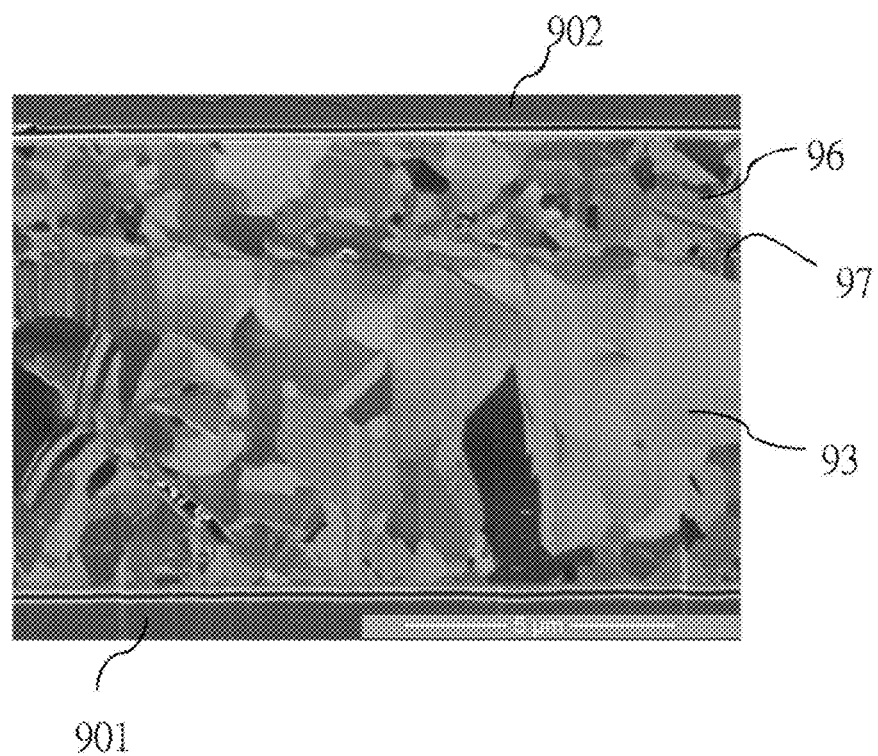
FIG. 9 is an optical microscope image of the Au film bonding structure in Example 2 of the present invention.

First, a first substrate and a second substrate were provided. The method described in Preparation Example 1 was used to form a first Au film on the first substrate. The first Au film was a [220] preferably oriented nanotwinned Au film. The method described in Preparation Example 2 was used to form a second Au film on the second substrate. The second Au film was a [111] preferably oriented nanotwinned Au film. The first Au film had a thickness of about 6 μm while the second Au film had a thickness of about 2 μm. Next, the first substrate and the second substrate were placed on the clamps to allow the first Au film and the second Au film to face toward each other. Then, the first substrate and the second substrate were placed in a vacuum furnace at a low vacuum of 10$^{-3}$ torr. The furnace was heated to 200° C. and maintained for 1 hour and a pressing force of 0.78 MPa was applied. By using the above steps, a bonding structure having a preferably oriented nanotwinned Au film was obtained. FIG. 9 is an optical microscope image of the Au film bonding structure in this example. This Au film bonding structure comprised: a first substrate 901 having a first Au film 93 and a second substrate 902 having a second Au film 96; wherein the first Au film 93 and the second Au film 96 were connected to each other with a gold bonding interface 97. No large void was observed in the gold bonding interface 97, which indicated a good bonding quality.

COMPARATIVE EXAMPLE 1

Figure 10:
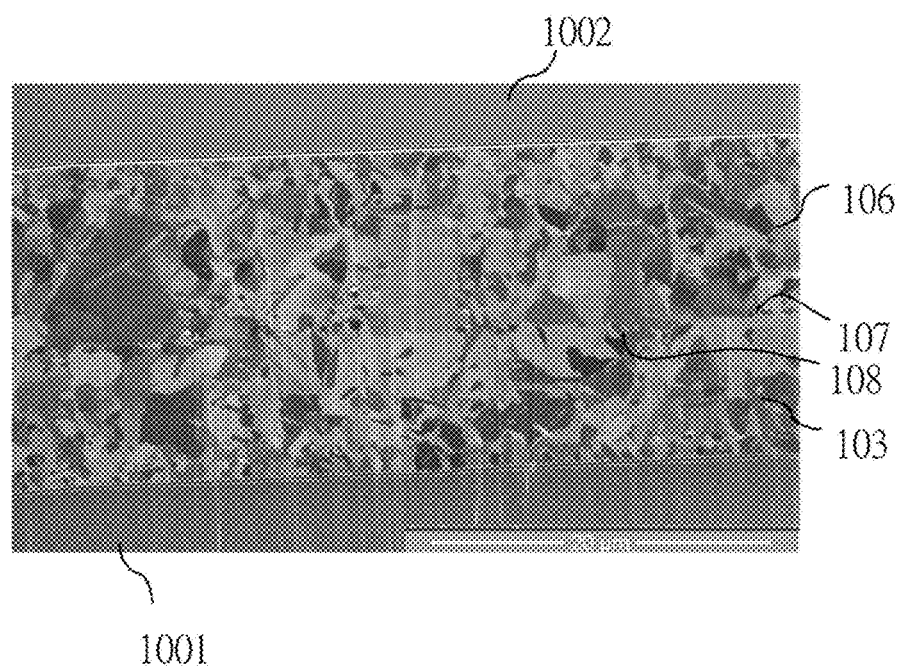
FIG. 10 is an optical microscope image of the Au film bonding structure in Comparative Example 1 of the present invention.

First, a first substrate and a second substrate were provided. The method described in Preparation Example 3 was used to form a first Au film and a second Au on the first substrate and on the second substrate, respectively. Each of the first Au film and the second Au film was an irregularly oriented Au film. The first Au film and the second Au film had a thickness of about 4 μm each. Next, the first substrate and the second substrate were placed on the clamps to allow the first Au film and the second Au film to face toward each other. Then, the first substrate and the second substrate were placed in a vacuum furnace at a low vacuum of $10^{-3}$ ton. The furnace was heated to 200° C. and maintained for 1 hour and a pressing force of 0.78 MPa was applied. By using the above steps, a bonding structure of an Au film was obtained. FIG. 10 is an optical microscope image of the Au film bonding structure in this example. This Au film bonding structure comprised: a first substrate 1001 having a first Au film 103 and a second substrate 1002 having a second Au film 106; wherein the first Au film 103 and the second Au film 106 were connected to each other with a gold bonding interface 107. A number of voids 108 were observed in the gold bonding interface 107, which indicated a poor bonding quality. This poor bonding quality may cause problems such as poor mechanical strength and so on.

As apparent from the above Examples and Comparative Example, the [220] preferably oriented nanotwinned Au film of the present invention has good hardness and mechanical property. Good bonding quality could be achieved with the Au films arranged in other orientations at low temperature and at low pressure. Therefore, this [220] preferably oriented nanotwinned Au film of the present invention could be used in the gold accessory industry and the jewelry industry to increase the hardness of gold ornaments. This [220] preferably oriented nanotwinned Au film of the present invention could also be used in the electronics industry to serve as an electrical contact.

The above embodiments are only for the purpose of better describing the present invention and are of exemplary nature. The scope of rights asserted by the present invention is based on the scope of the claims in this application, and is not intended to be limited by the above embodiments.

What is claimed is:

1. A method for preparing an oriented nanotwinned Au film, comprising:
    (A) providing a plating apparatus comprising an anode, a cathode, a direct current supply, and a plating solution, wherein the direct current supply is electrically connected to the anode and the cathode that are immersed in the plating solution; and
    (B) providing a direct current supply to provide a direct current for plating where an oriented nanotwinned Au film forms on a surface of the cathode;
    wherein the oriented nanotwinned Au film is stacked along a [220] crystallographic axis orientation in a thickness direction of the oriented nanotwinned Au film; and at least 50% by volume of the oriented nanotwinned Au film is composed of a plurality of nanotwinned Au grains which are adjacent to each other, arranged in a direction perpendicular to the thickness direction, and stacked along a [111] crystallographic axis orientation; and the plating solution comprises a gold ion, a chloride ion, and an acid.

2. The method of claim 1, wherein in step (B), the cathode or the plating solution is rotated at a rotational speed of 300-1500 rpm during plating.

3. The method of claim 1, wherein in step (B), the direct current supply provides a direct current with a current density of 1-100 mA/cm$^2$.

4. The method of claim 1, wherein the plating solution further comprises at least one from the group consisting of: a surfactant, a lattice modification agent, and mixtures thereof.

5. The method of claim 1, wherein the acid of the plating solution is at least one from the group consisting of: hydrochloric acid, nitric acid, and sulfuric acid.

6. The method of claim 1, wherein the acid of the plating solution has a concentration of 5-15 g/L.

7. The method of claim 1, wherein the gold ion of the plating solution is obtained by dissociation of a gold-containing salt which is at least one from the group consisting of: a gold sulfate and a gold sulfite.

8. The method of claim 1, wherein the chloride ion of the plating solution is at least one from the group consisting of: hydrochloric acid, perchloric acid, chloric acid, chlorous acid, and hypochlorous acid.

* * * * *